(12) United States Patent
Na

(10) Patent No.: US 11,151,335 B2
(45) Date of Patent: Oct. 19, 2021

(54) MACHINE TRANSLATION USING ATTENTION MODEL AND HYPERNETWORK

(71) Applicant: SAMSUNG ELECTRONICS CO., LTD., Suwon-si (KR)

(72) Inventor: Hwidong Na, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 93 days.

(21) Appl. No.: 16/445,660

(22) Filed: Jun. 19, 2019

(65) Prior Publication Data

US 2020/0192985 A1  Jun. 18, 2020

(30) Foreign Application Priority Data

Dec. 18, 2018 (KR) .................. 10-2018-0164484

(51) Int. Cl.

| | |
|---|---|
| *G06F 40/58* | (2020.01) |
| *G06N 3/04* | (2006.01) |
| *G06F 40/30* | (2020.01) |
| *G06F 40/42* | (2020.01) |
| *G06F 40/55* | (2020.01) |
| *G06F 40/205* | (2020.01) |

(52) U.S. Cl.
CPC ............ *G06F 40/58* (2020.01); *G06F 40/205* (2020.01); *G06F 40/30* (2020.01); *G06F 40/42* (2020.01); *G06F 40/55* (2020.01); *G06N 3/04* (2013.01)

(58) Field of Classification Search
CPC ........... G06F 40/40–58; G06F 16/3337; G06F 40/30; G06F 40/205; G06N 3/04

USPC ......................................................... 704/2–8
See application file for complete search history.

(56) References Cited

U.S. PATENT DOCUMENTS

| | | | | |
|---|---|---|---|---|
| 2010/0198579 | A1* | 8/2010 | Cunnington | H04L 12/1822 704/3 |
| 2011/0307244 | A1* | 12/2011 | He | G06F 40/45 704/4 |
| 2017/0140753 | A1* | 5/2017 | Jaitly | G10L 15/16 |
| 2017/0323203 | A1* | 11/2017 | Matusov | G06F 16/30 |
| 2017/0351663 | A1* | 12/2017 | Sordoni | G06N 3/0454 |
| 2018/0129972 | A1 | 5/2018 | Chen et al. | |

(Continued)

FOREIGN PATENT DOCUMENTS

| | | |
|---|---|---|
| KR | 10-2018-0017622 A1 | 2/2018 |
| KR | 10-2018-0019342 A1 | 2/2018 |
| KR | 10-2018-0019371 A1 | 2/2018 |

OTHER PUBLICATIONS

Platanios et al. "Contextual Parameter Generation for Universal Neural Machine Translation". In Proceedings of the 2018 Conference on Empirical Methods in Natural Language Processing. Aug. 26, 2018. (Year: 2018).*

(Continued)

*Primary Examiner* — Jesse S Pullias
(74) *Attorney, Agent, or Firm* — NSIP Law

(57) ABSTRACT

A machine translation method includes using an encoder of a source language to determine a feature vector from a source sentence expressed in the source language, using an attention model of a target language to determine context information of the source sentence from the determined feature vector, and using a decoder of the target language to determine a target sentence expressed in the target language from the determined context information.

17 Claims, 11 Drawing Sheets

(56) References Cited

U.S. PATENT DOCUMENTS

2018/0203850 A1 7/2018 Zheng et al.
2018/0341860 A1* 11/2018 Shazeer .................. G06N 3/04

OTHER PUBLICATIONS

Wu et al. "Google's Neural Machine Translation System: Bridging the Gap between Human and Machine Translation". arXiv pre-prints, 2016 (Year: 2016).*
Ha et al. "HyperNetworks". arXiv pre-prints, 2016 (Year: 2016).*
Lim H., "Comparative Analysis of Vocabulary Dictionary Unite for Korean-Chinese Neural Machine Translation", *Hanyang University*, Aug. 2018, pp. 1-62 (62 pages in Korean).
Wu Y. et al., "Google's Neural Machine Translation System: Bridging the Gap between Human and Machine Translation", arXiv:1609.08144v2 [cs.CL], Oct. 8, 2016, p. 1-23 (23 pages in English).

* cited by examiner

1100

MACHINE TRANSLATION USING ATTENTION MODEL AND HYPERNETWORK

CROSS-REFERENCE TO RELATED APPLICATIONS

This application claims the benefit under 35 USC 119(a) of Korean Patent Application No. 10-2018-0164484 filed on Dec. 18, 2018, in the Korean Intellectual Property Office, the entire disclosure of which is incorporated herein by reference for all purposes.

BACKGROUND

1. Field

The following description relates to a method and apparatus with machine translation.

2. Description of Related Art

Machine translation may be used to translate a sentence, a paragraph, a phrase, or a word expressed in a language different from a native language of a user. The machine translation may be implemented through an encoder, an attention model, and a decoder, and may typically need an ever increasing number of models to meet an ever increasing number of pairs of source languages and target languages.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a machine translation method includes using an encoder of a source language to determine a feature vector from a source sentence expressed in the source language, using an attention model of a target language to determine context information of the source sentence from the determined feature vector, and using a decoder of the target language to determine a target sentence expressed in the target language from the determined context information.

A model of the encoder of the source language and a model of a decoder of the source language may be the same.

A model of the decoder of the target language and a model of an encoder of the target language may be the same.

The attention model of the target language may be unrelated to the source language to be translated into the target language.

The attention model or the decoder of the target language may include a parameter determined in a hypernetwork of the target language.

The attention model of the target language may include a parameter determined by the hypernetwork to which data output from an encoder of another language different from the target language is input.

The decoder of the target language may include a parameter determined by the hypernetwork to which data output from the attention model of the target language is input.

The encoder of the source language may include a parameter determined by a hypernetwork of the source language.

The encoder of the source language may include a parameter determined by the hypernetwork to which data expressed in the source language is input.

The encoder of the source language to be translated into the target language may be determined by a hypernetwork of the target language.

A non-transitory computer-readable storage medium storing instructions that, when executed by a processor, may cause the processor to perform the machine translation method.

In another general aspect, a machine translation apparatus includes a memory configured to store at least one model of a source language and a target language, and a processor. The processor configured to: determine, using an encoder of the source language, a feature vector from a source sentence expressed in the source language; determine, using an attention model of the target language, context information of the source sentence from the determined feature vector; and determine, using a decoder of the target language, a target sentence expressed in the target language from the determined context information.

A model of the encoder of the source language and a model of a decoder of the source language may be the same.

A model of the decoder of the target language and a model of an encoder of the target language may be the same.

The attention model of the target language may be unrelated to the source language to be translated into the target language.

The attention model and the decoder of the target language may include a parameter determined by a hypernetwork of the target language.

The encoder of the source language may include a parameter determined by a hypernetwork of the source language.

The encoder of the source language to be translated into the target language may be determined by a hypernetwork of the target language.

In another general aspect, a machine translation method includes determining a model parameter of an encoder of a first language upon data of a first language being input to a hypernetwork of the first language; determining a model parameter of an attention model of the first language upon data expressed in a second language, different from the first language, being input into an encoder of the second language and the output of the encoder of the second language being into the hypernetwork; and determining a model parameter of a decoder of the first language upon data expressed in the second language being input to the encoder of the second language, the output data of the encoder of the second language being input to the attention model of the first language, and the output data from the attention model of the first language being input to the hypernetwork.

The machine translation apparatus may further include a second hypernetwork of the second language.

The first language may be translated into the second language using the encoder of the first language, an attention model of the second language, and a decoder of the second first language.

The machine translation apparatus may generate the attention model of the second language and the decoder of the second first language using a parameter determined by the second hypernetwork.

The model parameter of the encoder of the first language and the model parameter of the decoder of the first language may be the same.

A model parameter of a decoder of the second language and a model parameter of an encoder of the second language may be the same.

The attention model of the second language may be unrelated to the first language to be translated into the second language.

Other features and aspects will be apparent from the following detailed description, the drawings, and the claims.

Figure 1:
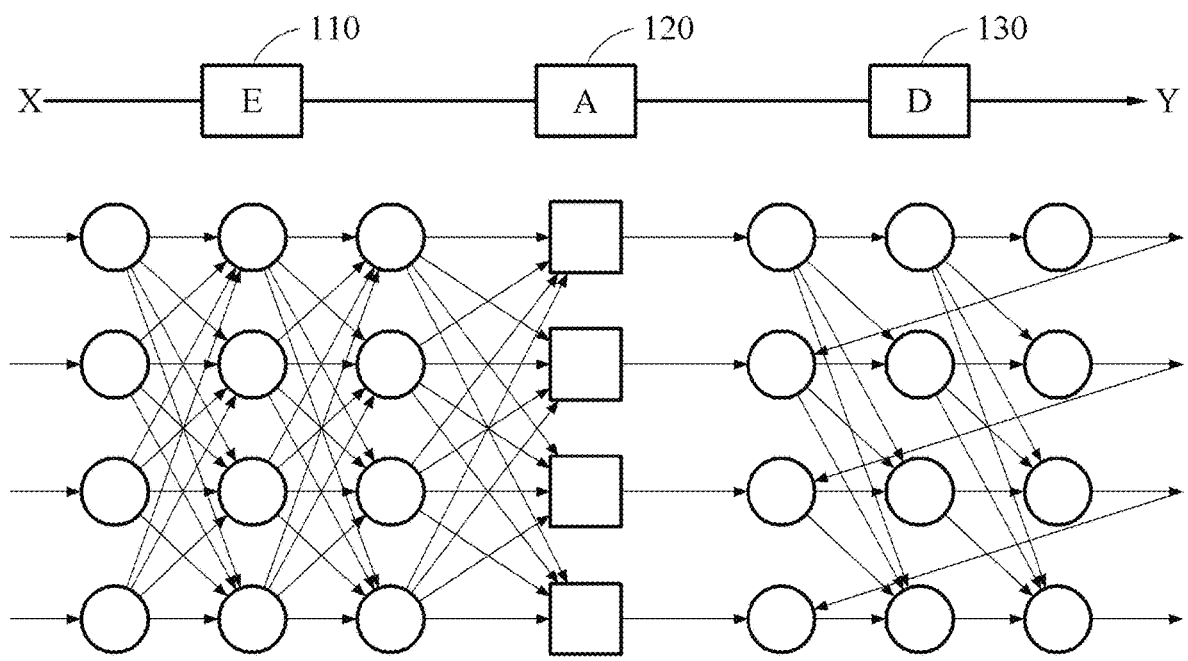
FIG. 1 is a diagram illustrating an example of an encoder, an attention model, and a decoder configuration.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

The terminology used herein is for describing various examples only and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein.

Also, in the description of example embodiments, detailed description of structures or functions that are thereby known after an understanding of the disclosure of the present application will be omitted when it is deemed that such description will cause ambiguous interpretation of the example embodiments.

Hereinafter, examples will be described in detail with reference to the accompanying drawings, and like reference numerals in the drawings refer to like elements throughout.

FIG. 1 is a diagram illustrating an example of an encoder, an attention model, and a decoder configuration.

FIG. 1 illustrates an encoder E 110, an attention model A 120, and a decoder D 130.

Referring to FIG. 1, a machine translation apparatus may translate a source sentence expressed in a source language X into a target sentence expressed in a target language Y using an encoder-decoder based neural network. The neural network may include a plurality of layers. Each of the layers may include a plurality of nodes of which nodes of neighboring layers may be connected through weighted connections. Weights may be assigned to the connections through training, and parameters of the weighted connections may include the weights.

The layers of the neural network may include an input layer, a hidden layer, and an output layer. For example, the input layer may receive an input to perform training or recognition and transmit the received input to the hidden layer, and the output layer may generate an output of the neural network based on a signal received from nodes of the hidden layer. The hidden layer may be a middle layer provided between the input layer and the output layer, and may convert, to a predictable value, training data or data which is a target of the recognition that is transmitted through the input layer.

In the example of FIG. 1, the encoder E 110 may determine a feature vector of a target sentence input to the encoder E 110. For example, the encoder E 110 may convert each of the words in the target sentence to a real number vector. The attention model A 120 may determine context information of the target sentence from the feature vector of the input target sentence. For example, the attention model A 120 may represent the context information by a sum of weights of the words included in the target sentence. The decoder D 130 may determine a target sentence expressed in the target language Y from the context information provided by the attention model A 120 for the target sentence. For example, the decoder D 130 may generate an appropriately translated word in the target language Y based on the context information.

Hereinafter, models implemented by the machine translation apparatus to translate a source sentence into a target sentence will be described in further detail with reference to the accompanying drawings.

Figure 2:
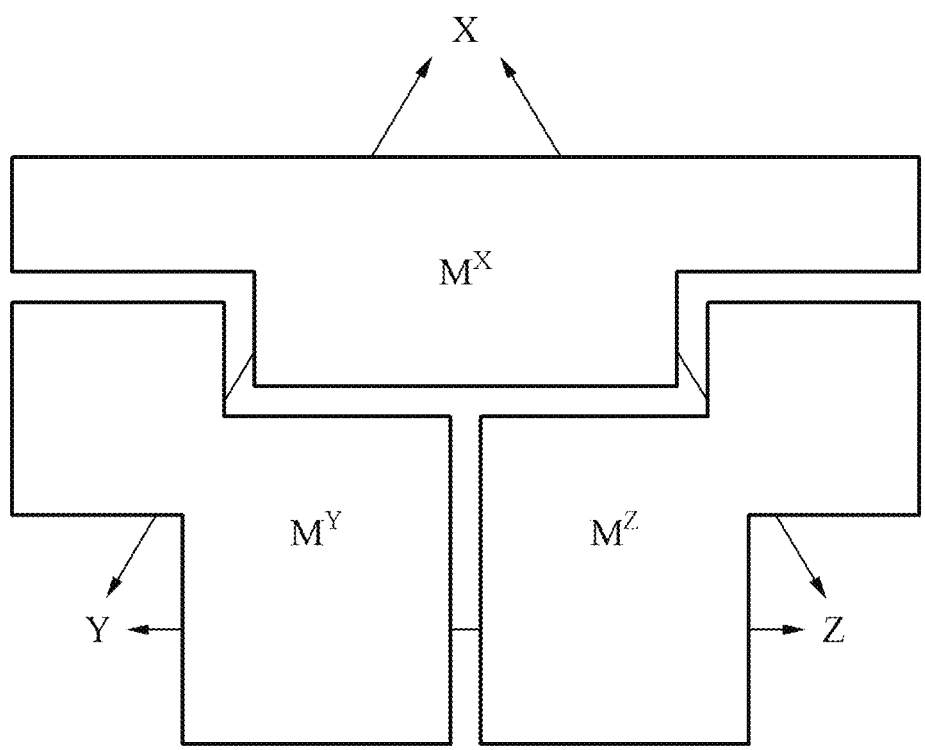
FIGS. 2 and 3 are diagrams illustrating an example of machine translation processes.
Figure 3:
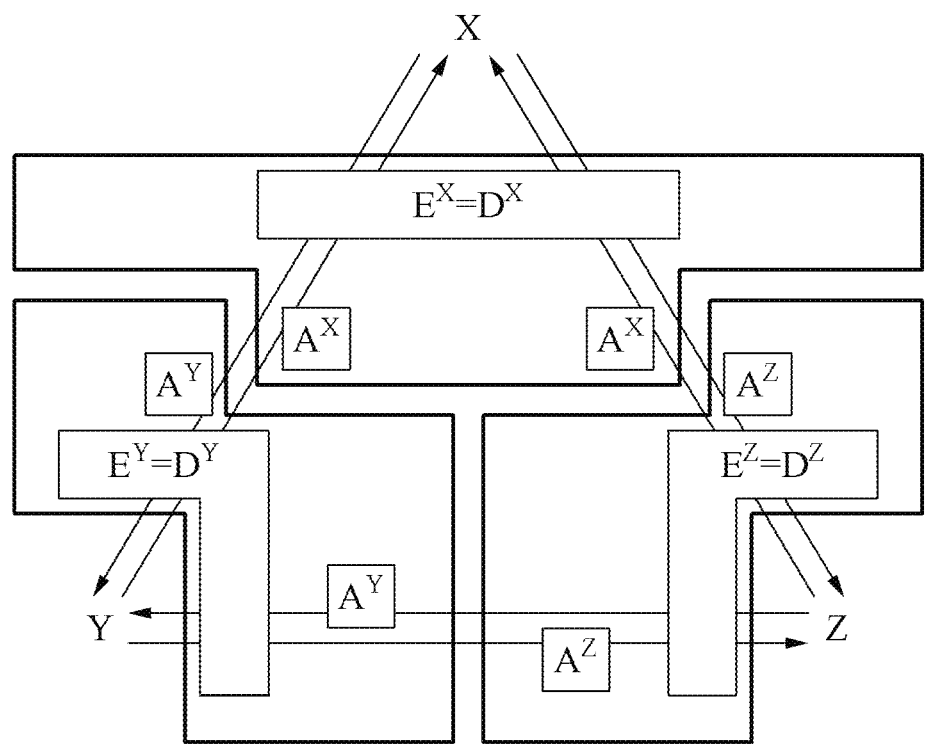

FIGS. 2 and 3 are diagrams illustrating an example of machine translation processes.

FIG. 2 illustrates an example of how a machine translation apparatus performs multilingual neural machine translation (NMT). In this example, the machine translation apparatus performs machine translation of words, phrases, or sentence(s) between two languages selected from multiple languages X, Y, and Z, using corresponding encoder ($E^{source}$) 110 and decoder ($D^{target}$) 130 models, e.g., wherein for language X there may exist $E^X$ and $D^X$, for language Y there may exist $E^Y$ and $D^Y$, and for language Z there may exist $E^Z$ and $D^Z$. For example, a word, phrase, or sentence(s) of language Z may be encoded by the encoder $E^Z$ 110 into one or more feature vectors or maps, and decoder $D^Z$ 130 may receive such Z language encoded one or more feature vectors or maps and would be thus trained to output the original word, phrase, or sentence(s) of language Z that were encoded by the encoder $E^Z$ 110. In a translation between languages Z and Y, for example, the encoder $E^Z$ 110 may translate a word, phrase, or sentence(s) of language Z to the aforementioned one or more feature vectors or maps, and then an attention model 120 trained with respect to the language Y may receive the aforementioned one or more feature vectors or maps and generates context information, which is then provided to the corresponding decoder $D^Y$ 130 that therefrom generates output of the language Y translation of the original word, phrase, or sentence(s) encoded by the encoder $E^Z$ 110. Here, the attention model 120 trained with respect to the language Y may be configured to perform such context information generation regardless of which encoded language feature vectors or maps are provided to the attention model 120 trained with respect to the language Y, e.g., the below discussed attention model $A^Y$. Also, for convenience of description, only three languages are illustrated in the example of FIG. 2; however, examples are not limited to the illustrated example, and words, phrases, or sentence(s) of a greater number of languages may be selectively translated using corresponding encoding models, decoding models, and such attention models. In addition, though references below may be made to a translation of sentences between different languages, and though examples above refer to translation of words, phrases, or sentence(s) between languages, examples are not limited to only words, phrases, or sentences that may be encoded by such encoders 110, or that may be resultantly generated by decoders 130.

FIG. 3 illustrates an example of a machine translation apparatus process.

An encoder and a decoder may be the same model. For example, a single model may be used as an encoder $E^X$ of a first language X and a decoder $D^X$ of the first language X.

An attention model of a target language may also be used for machine translation. That is, the attention model used for the machine translation may be irrelevant to, or independent of, a source language to be translated into the target language. For example, as illustrated, when machine-translating a source sentence expressed in a source language X into a target sentence expressed in a target language Y, an attention model $A^Y$ of the target language Y may be used, and the attention model $A^Y$ may be irrelevant to, or independent of, the source language X.

In the example of FIG. 3, for convenience of description, the source sentence expressed in the source language X is machine-translated into the target sentence expressed in the target language Y. In this example, the machine translation apparatus may determine a feature vector from the source sentence expressed in the source language X using an encoder $E^X$ of the source language X. The machine translation apparatus may determine context information of the source sentence from the determined feature vector using the attention model $A^Y$ of the target language Y. The machine translation apparatus may determine the target sentence expressed in the target language Y from the determined context information using a decoder $D^Y$ of the target language Y.

In another example, the machine translation apparatus may determine a feature vector from the source sentence expressed in a source language Z using an encoder $E^Z$ of the source language Z. The machine translation apparatus may determine context information of the source sentence from the determined feature vector using the attention model $A^Y$ of a target language Y. The machine translation apparatus may determine the target sentence expressed in the target language Y from the determined context information using a decoder $D^Y$ of the target language Y.

In still another example, when machine-translating a source sentence expressed in a source language Y into a target sentence expressed in a target language X, the machine translation apparatus may translate the source sentence into the target sentence using an encoder $E^Y$ of the source language Y, and an attention model $A^X$ and a decoder $D^X$ of the target language X.

As described above, the machine translation apparatus may perform translation using an encoder of a source language, and an attention model and a decoder of a target language. The models used for the translation may be irrelevant to, or independent of, an attention model and a decoder of the source language, and an encoder of the target language.

Figure 4:
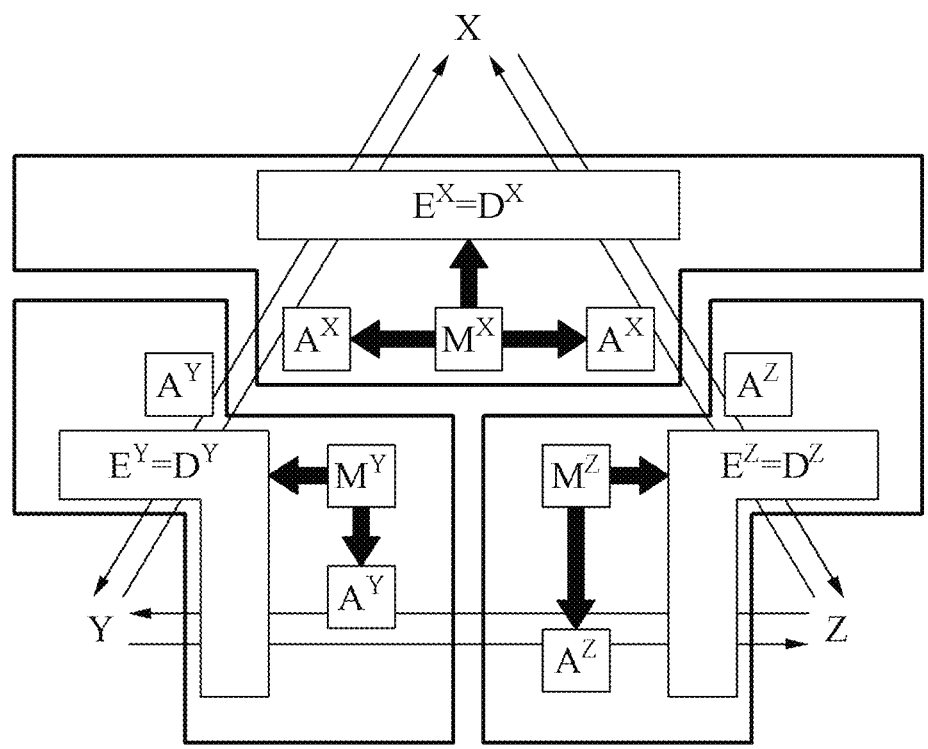
FIGS. 4 and 5 are diagrams illustrating an example of machine translation processes using a hypernetwork.
Figure 5:
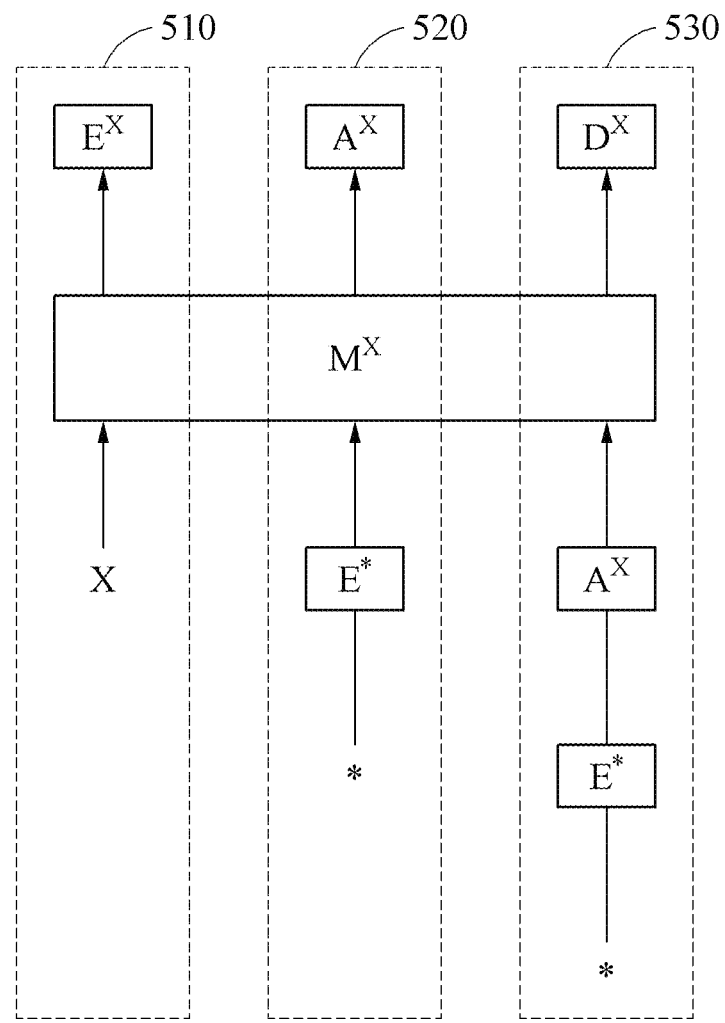

FIGS. 4 and 5 are diagrams illustrating an example of machine translation processes using a hypernetwork.

FIG. 4 illustrates an example of how machine translation may be performed by generating an encoder, an attention model, and a decoder that may be needed for the translation through a hypernetwork.

In an example, models needed for machine translation may be generated through a hypernetwork. The hypernetwork may determine a model parameter, and such a parameter used in a certain model may be determined based on input data.

In a first example 510 of FIG. 5, when data expressed in a first language X is input to a hypernetwork $M^X$ of the first language X, the hypernetwork $M^X$ determines a model parameter of an encoder $E^X$. A machine translation apparatus generates the encoder $E^X$ using the model parameter determined in the hypernetwork $M^X$ and uses it for machine translation. For example, a vector-type input is input to the hypernetwork $M^X$, and the hypernetwork $M^X$ processes the input in a form of 3D tensor, and a matrix-type encoder $E^X$ weight is output. The input of the hypernetwork $M^X$ may be an embedding vector (a sequence type) representing a single word or sentence.

In a second example 520 of FIG. 5, when data expressed in another language *, different from the first language X, is input into an encoder E* of the language * and output into the hypernetwork $M^X$ of the first language X, the hypernetwork $M^X$ determines a model parameter of an attention model $A^X$. The machine translation apparatus generates the attention model $A^X$ using the model parameter determined by the hypernetwork $M^X$ and uses it for the machine translation. For example, a vector-type encoded input is input to the hypernetwork $M^X$, and the hypernetwork $M^X$ processes the input in a form of 3D tensor, and a matrix-type attention $A^X$ weight is output. The input of the hypernetwork $M^X$ may be a vector (a sequence type) in which the output of the first example 510 is multiplied by the encoder weight.

In a third example 530 of FIG. 5, the data expressed in the language *, different from the first language X, is input to the encoder $E^*$ of the language *. In addition, output data of the encoder $E^*$ is input to the attention model $A^X$. When data output from the attention model $A^X$ is input to the hypernetwork $M^X$ of the first language X, the hypernetwork $M^X$ determines a model parameter of a decoder $D^X$. The machine translation apparatus generates the decoder $D^X$ using the model parameter determined by the hypernetwork $M^X$ and uses it for the machine translation. For example, a vector-type weighted sum of encoded input is input to the hypernetwork $M^X$, and the hypernetwork $M^X$ processes the input in a form of 3D tensor, and a matrix-type decoder $D^X$ weight is output. The input of the hypernetwork $M^X$ may be a vector (a sequence type) indicated by a sum of weights obtained by applying an attention weight to the output of the second example 520.

Hereinafter, how machine translation is performed using a hypernetwork will be described in detail. For the convenience of description, an example of how a source sentence expressed in a source language X is machine-translated into a target sentence expressed in a target language Y will be described.

The machine translation apparatus may include a hypernetwork for each language. For example, the machine translation apparatus may include hypernetworks, for example, a hypernetwork $M^X$, a hypernetwork $M^Y$, and a hypernetwork $M^Z$. When machine-translating a source sentence of a source language X into a target sentence of a target language Y, an encoder $E^X$ of the source language X, an attention model $A^Y$ of the target language Y and a decoder $D^Y$ of the target language Y may be needed. The machine translation apparatus may generate the encoder $E^X$ using a parameter determined by the hypernetwork $M^X$ of the source language X. In addition, the machine translation apparatus may generate the attention model $A^Y$ and the decoder $D^Y$ using a parameter determined by the hypernetwork $M^Y$ of the target language Y.

That is, the machine translation apparatus may generate an encoder of a source language using a parameter determined by a hypernetwork of the source language, and generate an attention model or a decoder of a target language using a parameter determined by a hypernetwork of the target language.

Figure 6:
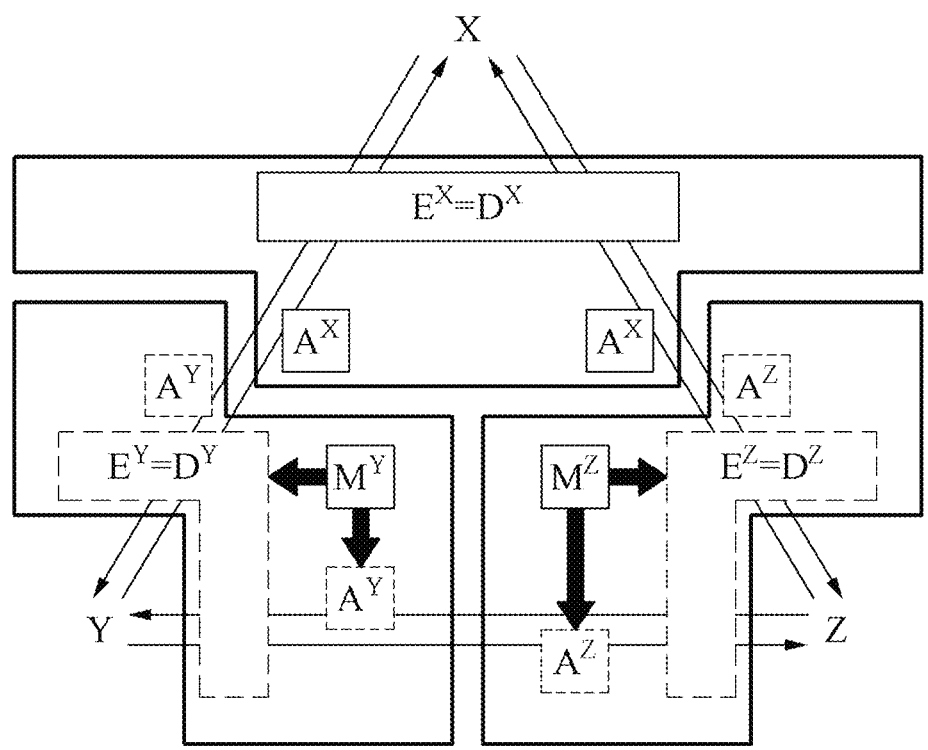
FIG. 6 is a diagram illustrating an example of a machine translation process using a hypernetwork.

FIG. 6 is a diagram illustrating an example of a machine translation process using a hypernetwork.

In general, a user may use a single native language X and desire to translate, the native language X into a first foreign language Y or a second foreign language Z, or translate the first foreign language Y or the second foreign language Z into the native language X. Thus, when performing machine translation, a probability that one of a source language and a target language is the native language X may be considerably higher than a probability that the one is the first foreign language Y or the second foreign language Z. That is, a frequency of using a model of the native language X may be higher than a frequency of using a model of the first foreign language Y or the second foreign language Z.

Thus, a machine translation apparatus may store, in a memory, a model of the native language X that is frequently used, for example, an encoder $E^X$ and decoder $D^X$, and an attention model $A^X$, and immediately use it when needed. In the meantime, the machine translation apparatus may not store, in the memory, a model of the first foreign language Y or the second foreign language Z that is not frequently used, and generate and use it from a hypernetwork only when needed.

In a case in which a memory capacity of an encoder-decoder and an attention model is greater than a memory capacity of a hypernetwork, the machine translation apparatus may store only the hypernetwork in the memory for a rarely used foreign language, and generate at least one of the encoder-decoder or the attention model from the hypernetwork when needed to perform machine translation. Thus, it is possible to effectively use the memory capacity.

In the example of FIG. 6, a model outlined by a solid line indicates a model that is stored in the memory of the machine translation apparatus, and a model outlined by a broken line indicates a model that, although not stored in the memory of the machine translation apparatus, may be generated from a hypernetwork.

Figure 7:
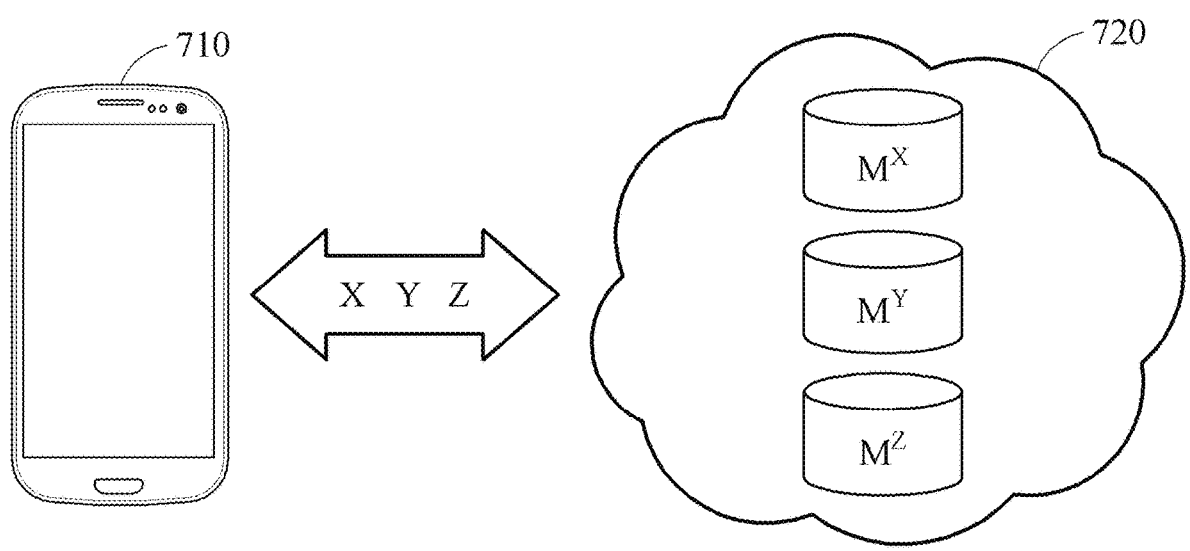
FIG. 7 is a diagram illustrating an example of a machine translation using a server.

FIG. 7 is a diagram illustrating an example of a machine translation process using a server.

Referring to FIG. 7, a server 720 stores therein hypernetworks $M^X$, $M^Y$, and $M^Z$. When a request for machine translation is received from a user terminal 710, the server 720 may perform the machine translation by generating models needed for the machine translation and transmit a result of the machine translation to the user terminal 710. Even though only a single hypernetwork is stored for each language, it is possible to perform the machine translation. Thus, when there is a greater number of language pairs that may be translated in the server 720, a greater effect in cost reduction may be expected from the perspective of service operation.

Figure 8:
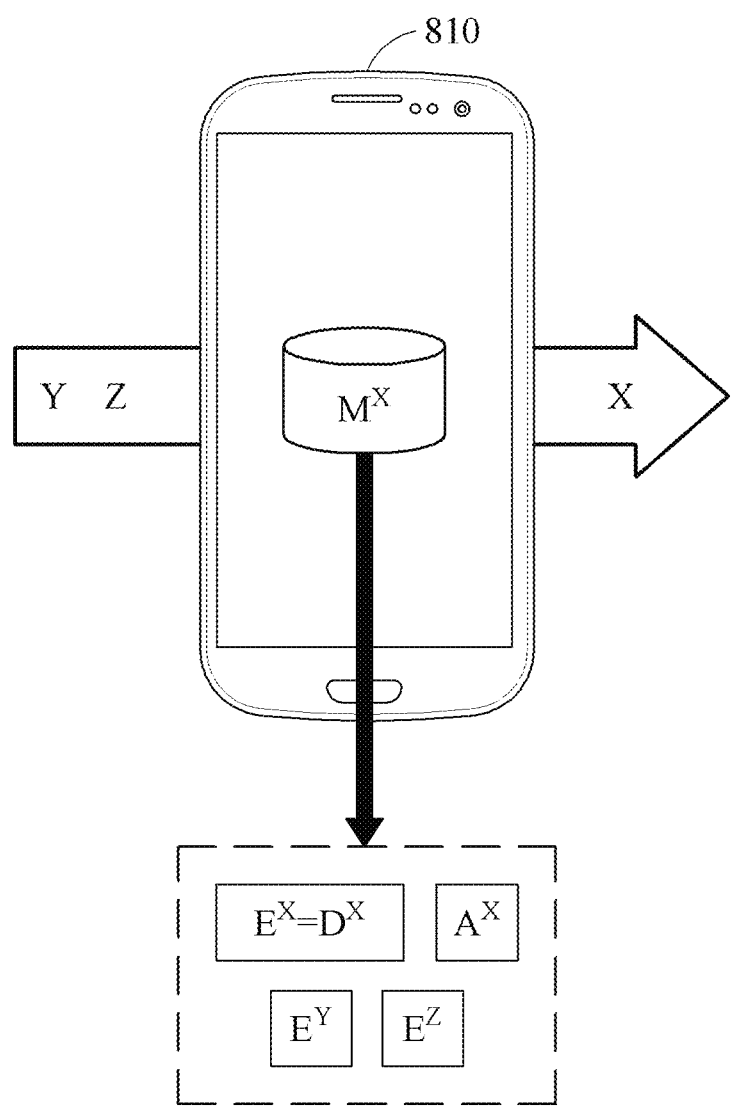
FIGS. 8 and 9 are diagrams illustrating an example of machine translation process using a hypernetwork.
Figure 9:
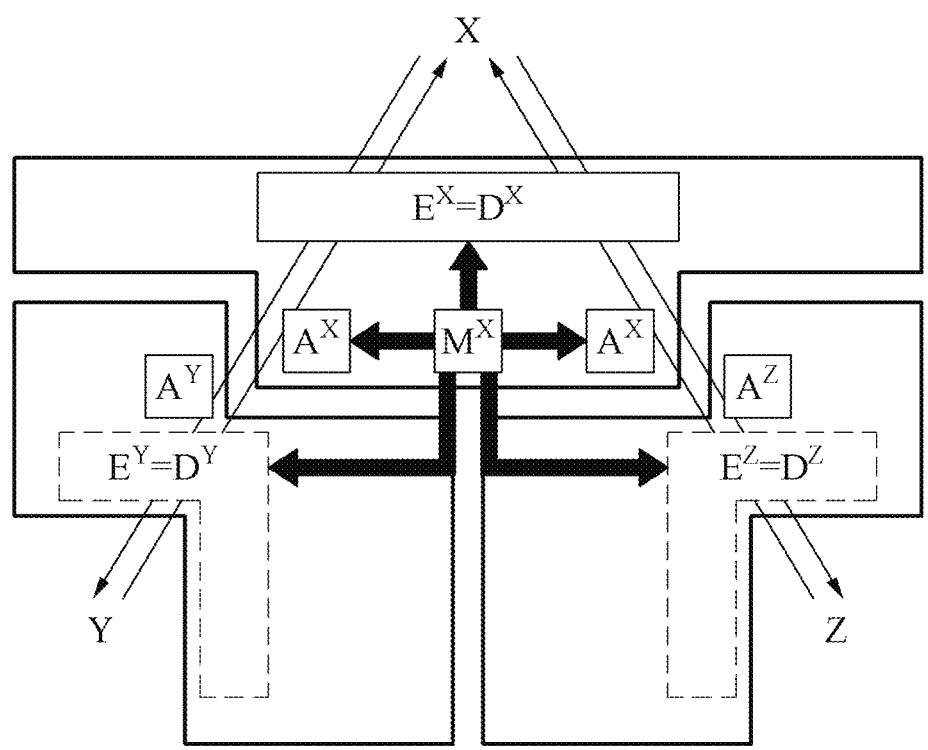

FIGS. 8 and 9 are diagrams illustrating an example of machine translation processes using a hypernetwork.

FIG. 8 illustrates an example of how machine translation is performed in a user terminal 810 using a hypernetwork. In the example of FIG. 8, for the convenience of description, a first source language Y or a second source language Z is translated into a target language X. The user terminal 810 stores therein a hypernetwork $M^X$ of the target language X. The hypernetwork $M^X$ may determine parameters of encoders $E^Y$ and $E^Z$ of the source languages Y and Z to be translated into the target language X in addition to parameters of an encoder-decoder $E^X$-$D^X$ of the target language X and an attention model $A^X$ of the target language X. That is, the encoders $E^Y$ and $E^Z$ of the source languages Y and Z may also be determined by the hypernetwork $M^X$ of the target language X. Thus, the user terminal 810 may perform machine translation only with the hypernetwork $M^X$ of the target language X in a limited environment, for example, a mobile environment and the like, from which a sufficient memory may not be expected.

FIG. 9 illustrates an example of how, through a hypernetwork $M^X$ of a target language X, encoders $E^Y$ and $E^Z$ of sources languages Y and Z, in addition to an encoder-decoder $E^X$-$D^X$ and an attention model $A^X$ of the target language X, are determined to be used for machine translation.

Figure 10:
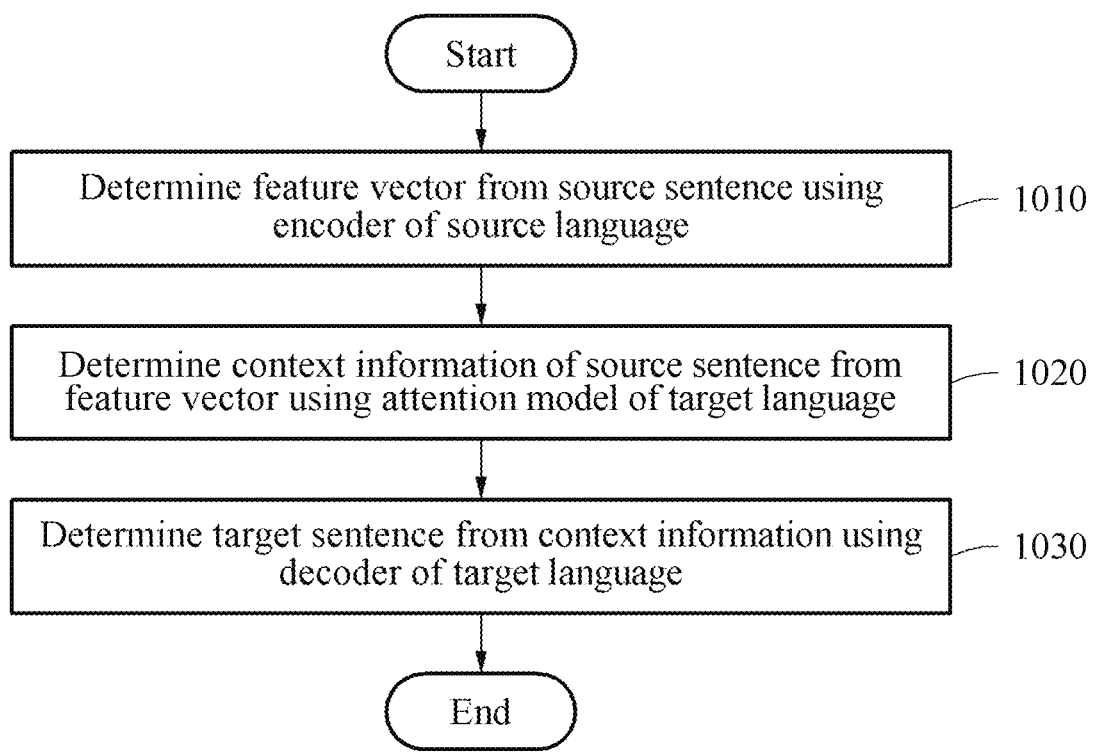
FIG. 10 is a flowchart illustrating an example of a machine translation method.

FIG. 10 is a flowchart illustrating an example of a machine translation method.

Hereinafter, a machine translation method to be performed by a processor included in a machine translation apparatus will be described with reference to FIG. 10.

Referring to FIG. 10, in operation 1010, the machine translation apparatus determines a feature vector from a source sentence expressed in a source language using an encoder of the source language. The encoder of the source language may be the same model as a decoder of the source language.

In operation 1020, the machine translation apparatus determines context information of the source sentence from the determined feature vector using an attention model of a target language. The attention model of the target language may be irrelevant to, or independent of, the source language to be translated into the target language.

In operation 1030, the machine translation apparatus determines a target sentence expressed in the target language from the determined context information using a decoder of the target language. The decoder of the target language may be the same model as an encoder of the target language.

The encoder of the source language may include a parameter determined by a hypernetwork of the source language. The attention model or the decoder of the target language may include a parameter determined by a hypernetwork of the target language. According to an example, the encoder of the source language to be translated into the target language may be determined by the hypernetwork of the target language.

What is described above with reference to FIGS. 1 through 9 may be applied to the operations described with reference to FIG. 10, and thus a more detailed and repeated description will be omitted here for increased clarity and conciseness.

Figure 11:
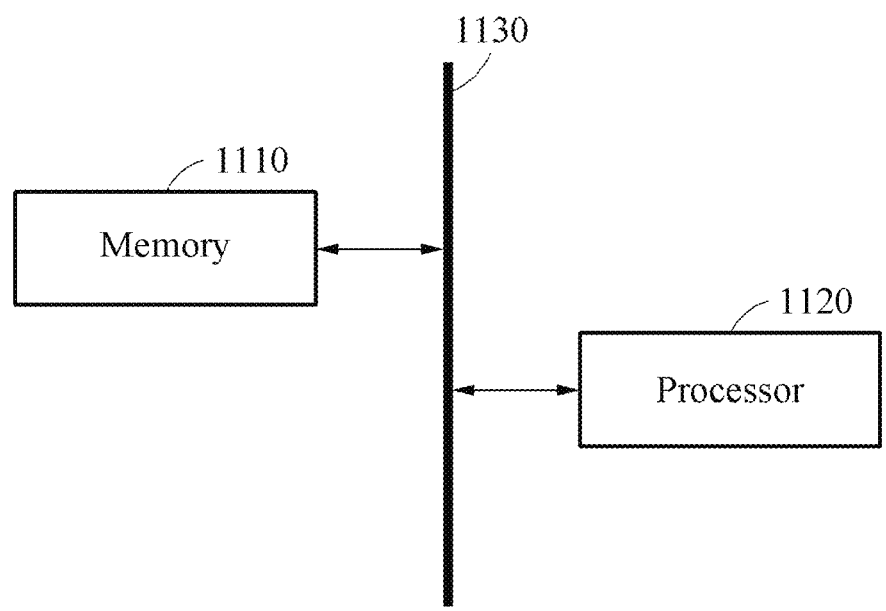
FIG. 11 is a diagram illustrating an example of an apparatus with machine translation.

FIG. 11 is a diagram illustrating an example of an apparatus with machine translation.

Referring to FIG. 11, a machine translation apparatus 1100 includes a memory 1100 and a processor 1120. The memory 1110 and the processor 1120 may communicate with each other through a bus 1130.

The memory 1110 may include a computer-readable instruction. When the instruction stored in the memory 1110 is executed in the processor 1120, the operations described above may be performed. The memory 1110 may be a volatile memory or a nonvolatile memory.

The processor 1120 may determine a feature vector from a source sentence expressed in a source language using an encoder of the source language, determine context information of the source sentence from the determined feature vector using an attention model of a target language, and determine a target sentence expressed in the target language from the determined context information using a decoder of the target language.

The machine translation 1100 may also perform other operations described herein.

The machine translation apparatus, the encoder E 110, the attention model A 120, the decoder D 130, the decoder $D^X$, $D^Y$, $D^Z$, the encoder $E^X$, $E^Y$, $E^Z$, the attention model $A^X$, $A^Y$, $A^Z$, the hypernetwork $M^X$, $M^Y$, $M^Z$ and other apparatuses, modules, devices, and other components described herein with respect to FIGS. 1-11 are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-11 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A machine translation method, comprising:
   determining a feature vector from a source sentence expressed in a source language using an encoder of the source language;
   determining context information of the source sentence from the determined feature vector using an attention model of a target language; and
   generating a translation of the source sentence by determining a target sentence expressed in the target language from the determined context information using a decoder of the target language,
   wherein an attention model of the source language includes a parameter determined by an implemented hypernetwork of the source language to which an output of an encoder of the target language is input.

2. The method of claim 1, wherein a model of the encoder of the source language and a model of a decoder of the source language are the same.

3. The method of claim 1, wherein a model of the decoder of the target language and a model of an encoder of the target language are the same.

4. The method of claim 1, wherein the attention model of the target language is irrelevant to the source language to be translated into the target language.

5. The method of claim 1, wherein the attention model or the decoder of the target language includes a parameter determined by an implemented hypernetwork of the target language.

6. A machine translation method, comprising:
   determining a feature vector from a source sentence expressed in a source language using an encoder of the source language;
   determining context information of the source sentence from the determined feature vector using an attention model of a target language; and
   generating a translation of the source sentence by determining a target sentence expressed in the target language from the determined context information using a decoder of the target language,
   wherein the attention model or the decoder of the target language includes a parameter determined by an implemented hypernetwork of the target language, and
   wherein the attention model of the target language includes a parameter determined by the hypernetwork of the target language to which data output from an encoder of another language different from the target language is input.

7. A machine translation method, comprising:
   determining a feature vector from a source sentence expressed in a source language using an encoder of the source language;

determining context information of the source sentence from the determined feature vector using an attention model of a target language; and generating a translation of the source sentence by determining a target sentence expressed in the target language from the determined context information using a decoder of the target language, wherein the attention model or the decoder of the target language includes a parameter determined by an implemented hypernetwork of the target language, and wherein the decoder of the target language includes a parameter determined by the hypernetwork of the target language to which data output from the attention model of the target language is input.

8. A non-transitory computer-readable storage medium storing instructions that, when executed by a processor, cause the processor to perform the machine translation method of claim 1.

9. A machine translation apparatus, comprising:
a memory configured to store at least one model of a source language and a target language; and
a processor configured to:
determine, using an encoder of the source language, a feature vector from a source sentence expressed in the source language;
determine, using an attention model of the target language, context information of the source sentence from the determined feature vector; and
determine, using a decoder of the target language, a target sentence expressed in the target language from the determined context information,
wherein the decoder of the target language includes a parameter determined by a hypernetwork of the target language to which data output from the attention model of the target language is input.

10. The apparatus of claim 9, wherein a model of the encoder of the source language and a model of a decoder of the source language are the same.

11. The apparatus of claim 9, wherein a model of the decoder of the target language and a model of an encoder of the target language are the same.

12. The apparatus of claim 9, wherein the attention model of the target language is unrelated to the source language to be translated into the target language.

13. The apparatus of claim 9, wherein the attention model includes a parameter determined by the hypernetwork of the target language.

14. The apparatus of claim 9, wherein the encoder of the source language includes a parameter determined by a hypernetwork of the source language.

15. The apparatus of claim 9, wherein the encoder of the source language to be translated into the target language is determined by the hypernetwork of the target language.

16. A machine translation method, comprising:
determining a model parameter of an encoder of a first language upon data of a first language being input to a first hypernetwork of the first language;
determining a model parameter of an attention model of the first language upon data expressed in a second language, different from the first language, being input into an encoder of the second language and the output of the encoder of the second language being into the first hypernetwork of the first language; and
determining a model parameter of a decoder of the first language upon data expressed in the second language being input to the encoder of the second language, the output data of the encoder of the second language being input to the attention model of the first language, and the output data from the attention model of the first language being input to the first hypernetwork of the first language,
wherein the encoder of the first language, the attention model of the first language, and the decoder of the first language are used to generate the machine translation.

17. The method of claim 16, wherein the machine translation further comprises a second hypernetwork of the second language.

* * * * *